US011965228B2

(12) United States Patent
Matsubara et al.

(10) Patent No.: US 11,965,228 B2
(45) Date of Patent: Apr. 23, 2024

(54) RESISTIVE MATERIAL, RESISTOR, AND MANUFACTURING METHOD OF RESISTIVE MATERIAL

(71) Applicant: KOA CORPORATION, Nagano (JP)

(72) Inventors: Shuhei Matsubara, Nagano (JP); Keishi Nakamura, Nagano (JP)

(73) Assignee: KOA Corporation, Nagano (JP)

( * ) Notice: Subject to any disclaimer, the term of this patent is extended or adjusted under 35 U.S.C. 154(b) by 325 days.

(21) Appl. No.: 17/600,968

(22) PCT Filed: Mar. 3, 2020

(86) PCT No.: PCT/JP2020/008985
§ 371 (c)(1),
(2) Date: Oct. 1, 2021

(87) PCT Pub. No.: WO2020/202988
PCT Pub. Date: Oct. 8, 2020

(65) Prior Publication Data
US 2022/0157497 A1 May 19, 2022

(30) Foreign Application Priority Data
Apr. 5, 2019 (JP) .................................. 2019-072722

(51) Int. Cl.
*C22C 29/12* (2006.01)
*B22F 1/12* (2022.01)
(Continued)

(52) U.S. Cl.
CPC ................ *C22C 29/12* (2013.01); *B22F 1/12* (2022.01); *B22F 3/14* (2013.01); *C04B 35/117* (2013.01); *C04B 35/64* (2013.01); *H01C 1/14* (2013.01); *H01C 7/003* (2013.01); *H01C 17/06553* (2013.01); *B22F 2302/25* (2013.01); *C04B 2235/3217* (2013.01); *C04B 2235/3232* (2013.01); *C04B 2235/405* (2013.01); *C04B 2235/5454* (2013.01); *C04B 2235/9607* (2013.01)

(58) Field of Classification Search
CPC ... C22C 29/12; B22F 1/12; B22F 3/14; C04B 35/117; C04B 35/64; H01C 1/14; H01C 7/003; H01C 17/06553
USPC .......................................................... 338/322
See application file for complete search history.

(56) References Cited

U.S. PATENT DOCUMENTS 11,136,257 B2 * 10/2021 Iguchi ........................ C03C 8/18
2008/0102300 A1 * 5/2008 Bhide ................. C04B 41/5144
428/545

FOREIGN PATENT DOCUMENTS

JP 2004-172250 A 6/2004
JP 2012-001402 A 1/2012
(Continued)

OTHER PUBLICATIONS

International Search Report, Application No. PCT/JP2020/008985, dated Jun. 9, 2021. ISA/Japan Patent Office.

*Primary Examiner* — renee s luebke
*Assistant Examiner* — Iman Malakooti
(74) *Attorney, Agent, or Firm* — Honigman LLP

(57) ABSTRACT

The resistive material for sensing current contains: metal particles selected from a group consisting of nichrome, copper-manganese, and copper-nickel; insulating particles selected from a group consisting of alumina, aluminum nitride, silicon nitride, and zirconia; and titanium oxide.

9 Claims, 5 Drawing Sheets

(51) Int. Cl.
    *B22F 3/14*        (2006.01)
    *C04B 35/117*    (2006.01)
    *C04B 35/64*     (2006.01)
    *H01C 1/14*      (2006.01)
    *H01C 7/00*      (2006.01)
    *H01C 17/065*   (2006.01)

(56) References Cited

FOREIGN PATENT DOCUMENTS

| | | | | |
|---|---|---|---|---|
| JP | 2012001402 A | 1/2012 | | |
| JP | 2015046567 | * 3/2015 | ............... | H01B 1/00 |
| JP | 2015046567 A | 3/2015 | | |
| JP | 2018-133539 A | 8/2018 | | |

* cited by examiner

RESISTIVE MATERIAL, RESISTOR, AND MANUFACTURING METHOD OF RESISTIVE MATERIAL

CROSS-REFERENCE TO RELATED APPLICATIONS

This application is the U.S. national stage of PCT/JP2020/008985 filed on Mar. 3, 2020, which claims priority of Japanese Patent Application No. JP 2019-072722 filed on Apr. 5, 2019, the contents of which are incorporated herein.

TECHNICAL FIELD

The present disclosure relates to a resistive material and a resistor for sensing current, and a manufacturing method of the resistive material.

BACKGROUND

JP2012-001402A discloses a resistive material formed by mixing and sintering particles of a matrix material and particles of a metal material.

SUMMARY

With the above-described resistive material, although a specific resistance can be increased because particles having an insulating property are used as the matrix material, it is difficult to suppress a fluctuation of the resistance value caused by changes in temperature so as to fall within a desired design range.

The present disclosure has been conceived in light of the above-described problem, and an object thereof is to provide a resistive material capable of achieving a high specific resistance and a control of a fluctuation of a resistance value, a resistor, and a manufacturing method of the resistive material.

According to one aspect of the present disclosure, a resistive material configured to sense current includes: metal particles selected from a group consisting of nichrome, copper-manganese, and copper-nickel; insulating particles selected from a group consisting of alumina, aluminum nitride, silicon nitride, and zirconia; and titanium oxide.

According to this aspect, because titanium oxide is dispersed in the resistive material, it is possible to increase the specific resistance and to make fluctuation of a resistance value controllable for the resistive material.

DESCRIPTION OF EMBODIMENTS

An embodiment of the present disclosure will be described below with reference to the attached drawings.

Description of Resistor

A structure of a resistor 1 in this embodiment will be described first with reference to FIGS. 1 to 2.

Figure 1:
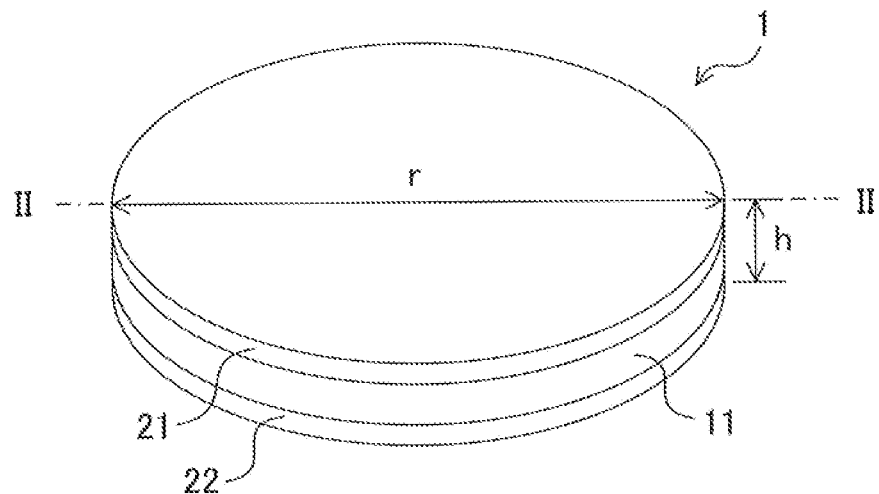
FIG. 1 is a diagram showing an example configuration of a resistor in an embodiment of the present disclosure.
Figure 2:
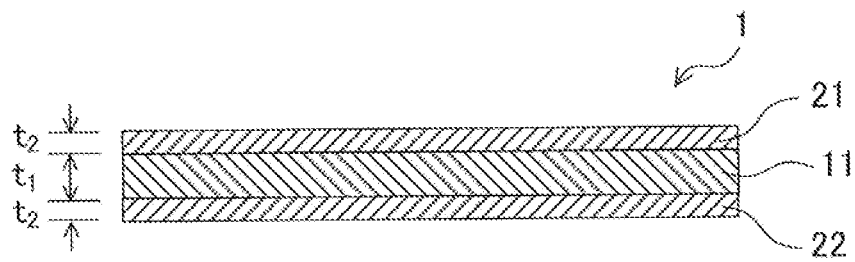
FIG. 2 is a sectional view taken along line II-II in FIG. 1.

FIG. 1 is a perspective view showing the structure of the resistor 1 in this embodiment, and FIG. 2 is a sectional view of the resistor 1 taken along a line II-II in FIG. 1.

The resistor 1 is a resistor for sensing current and is referred to as a current sensing resistor or a shunt resistor. The resistor 1 is used for an application of sensing large current by being installed in a power module, for example.

In this embodiment, in order to increase an accuracy of sensing of high-frequency current, the resistor 1 is formed to have a thin shape so as to reduce a self-inductance value of the resistor 1. The resistor 1 is formed to have a flat disc shape and is provided with a resistance body 11, which is constituted of a resistive material, and two electrodes 21 and 22 that sandwich the resistance body 11.

A thickness t1 of the resistance body 11 is set to be smaller than several millimeters, for example, such that the self-inductance value of the resistor 1 is reduced. In this embodiment, the thickness t1 of the resistance body 11 is set at 0.2 mm. In addition, in order to facilitate implementation to a wiring pattern or implementation to a power semiconductor, the resistance body 11 is formed such that a diameter r is larger than the thickness t1 of the resistance body 11. For example, the diameter r of the resistance body 11 is set at several millimeters. In this embodiment, the diameter r of the resistance body 11 is set at 3 mm.

In this embodiment, current paths are formed in the thickness direction of the resistance body 11, in other words, in the direction extending between the one electrode 21 and the other electrode 22. Because these current paths are shorter than those in the general shunt resistor, it is required to design a specific resistance (volume resistance value) of the resistance body 11 so as to have a greater value than the specific resistance of an alloy itself used for the general shunt resistor.

For example, in a case in which the resistor 1 is used for the application of sensing the large current, it is expected that the resistance value of the resistance body 11 is to be set at a value falling within a range from higher than or equal to 50 μΩ to lower than or equal to 1,000 μΩ. Thus, as the resistive material constituting the resistance body 11, it is preferable to use the resistive material, the specific resistance (the volume the resistance value) of which can be controlled so as to fall within a range from higher than or equal to 200 μΩ·cm (micro ohm centimeters) to lower than or equal to 300,000 μΩ·cm.

The two electrodes 21 and 22 are electrodes for allowing the current to flow in the direction extending between the pair of electrodes 21 and 22, in other words, in the thickness direction of the resistance body 11, and the electrodes 21 and 22 are formed by using a metal material having a high electrically conductive property. The electrodes 21 and 22 are respectively formed on both surfaces of the resistance body 11, and specifically, the one electrode of the electrodes 21 and 22 is formed on an upper surface of the resistance body 11, and the other electrode is formed of a lower surface of the resistance body 11.

In order to make the resistor 1 to have a lower profile, it is preferable that the electrodes 21 and 22 be formed so as to each has a thinner thickness t2. For example, the thickness t2 of each of the electrodes 21 and 22 is made so as to be thinner than the thickness t1 of the resistance body 11. In this embodiment, both of the thicknesses t2 of the electrodes 21 and 22 are set at 0.1 mm.

As described above, with the resistor 1 in this embodiment, because a thickness h of the resistor 1 is made thin while ensuring the resistance value required for the sensing of the current, it is possible to reduce the self-inductance value of the resistor 1 for sensing the current. Thus, it is possible to reduce a sensing error for the high-frequency current due to the inductance of the resistor 1 while ensuring an S/N ratio of a sensing voltage caused in the resistor 1.

Description of Resistive Material

A resistive material 11a is formed of insulating particles having the insulating property, metal particles having the electrically conductive property, and additive that stabilizes a resistance characteristic such that the specific resistance of the resistance body 11 becomes larger than the specific resistance of a resistance body forming the general shunt resistor (higher than or equal to 50 μΩ·cm and lower than or equal to 100 μΩ·cm).

The resistive material 11a has a structure in which the additive is dispersed in the insulating particles and the metal particles. From the view point of increasing the specific resistance of the resistive material 11a, it is preferred to use the resistive material in which a proportion of the insulating particles by volume in the resistive material 11a is higher than or equal to a proportion of the metal particles by volume. The resistive material 11a is formed of a sintered body that is formed of the insulating particles, the metal particles, and the additive.

Here, the metal particles, the insulating particles, and the additive forming the resistive material 11a are respectively explained.

Metal Particles

As the metal particles forming the resistive material 11a, the resistive material of the general shunt resistor may be used. From the view point of ensuring a stability of the resistance characteristic, the metal material suitable for the sensing of the large current, such as for example, the alloy with a small rate of change of the resistance value by the temperature change of the resistance body 11 is preferred.

As a specific example of the metal particles, the alloy selected from metal materials such as nichrome, Manganin®, Zeranin®, copper-nickel, and so forth may be used. Especially, from the view point of ensuring the resistance value of the resistive material, nichrome is preferably used. In addition, from the view point of ensuring processability, Manganin® is preferably used. As described above, it is preferable to form the metal particles forming the resistive material 11a by using the metal material selected from a group consisting of nichrome, copper-manganese, and copper-nickel.

Nichrome described above is Ni—Cr alloy or the alloy that contains the Ni—Cr alloy as the main component, copper-manganese is a Cu—Mn alloy or the alloy that contains the Cu—Mn alloy as the main component, and copper-nickel is a Cu—Ni alloy or the alloy that contains the Cu—Ni alloy as the main component. In the above, Manganin® is a Cu—Mn—Ni alloy or the alloy that contains the Cu—Mn—Ni alloy as the main component, and Zeranin® is a Cu—Mn—Sn alloy or the alloy that contains the Cu—Mn—Sn alloy as the main component.

In addition, from the view point of ensuring the current paths in the resistive material 11a, for the proportion (content) of the metal particles, it is preferable that the content of the metal particles be set at higher than or equal to 30 vol % based on the mixture of the metal particles, the insulating particles, and the additive forming the resistive material 11a. In addition, from the view point of increasing the specific resistance of the resistive material 11a so as to be higher than the specific resistance of the metal particles themselves, it is preferable that the content of the metal particles be set lower than or equal to 80 vol % based on the mixture.

Insulating Particles

A ceramic material having a superior heat resistance in addition to the electrically insulating property may be used as the insulating particles forming the resistive material 11a. For example, from the view point of suppressing formation of a crack in a joint portion due to thermal stress, as the ceramic material, the ceramic material selected from a group consisting of aluminum oxide (Al2O3), aluminum nitride (AlN), silicon nitride (Si3N4), and zirconia (ZrO2) may be used. In the following, aluminum oxide and aluminum nitride are referred to as "alumina" and "aluminum nitride", respectively.

Among ceramic materials described above, from the view point of ensuring heat dissipation and heat cycle durability, it is preferred to use alumina that is widely used as an insulating material. In addition, for an application where higher heat dissipation is required, it is preferred to use aluminum nitride having higher thermal conductivity, and for an application where high heat cycle durability is required, it is preferred to use silicon nitride.

Additive

A modifier for increasing the specific resistance of the resistive material 11a and for lowering a temperature coefficient of resistance (TCR) of the resistive material 11a is added to the resistive material 11a. The TCR is an indicator indicating a rate of change of the resistance value along with the change in the temperature of the resistive material 11a. In the shunt resistor, there is a tendency for the sensing error of the current to be increased along with the increase in the absolute value of the TCR.

As the additive forming the resistive material 11a, titanium oxide (TiO2) having the insulating property, and superior dispersibility and chemical stability is used. By using titanium oxide, the variation of and reduction in reproducibility of the resistance characteristic of the resistive material 11a are suppressed. The present inventors assume that the reason for this is that titanium oxide is easily dispersed in a metal body, which is formed by the metal particles brought into contact with each other, because titanium oxide has a low reactivity to the metal particles selected from a group consisting of nichrome, copper-manganese, and copper-nickel.

In addition, titanium oxide has a property in that its resistance value is decreased as its temperature is increased from the room temperature. Thus, when titanium oxide is dispersed in the resistive material 11a, the TCR of the resistive material 11a is decreased as a whole.

In order to effectively reduce the TCR of the resistive material 11a, it is preferable to add titanium oxide to the resistive material in which the volume ratio (occupancy) of the insulating particles is higher than the volume ratio of the metal particles. By adding a certain amount of titanium oxide to such a resistive material, the volume ratio of titanium oxide relative to the metal particles is increased, and thereby, the TCR of the resistive material 11a is likely to be reduced. By doing so, the stability of the resistance characteristic of the resistive material 11a is improved.

As described above, by dispersing titanium oxide into the resistive material 11a, it becomes possible to adjust the TCR of the resistive material 11a so as to fall within a range from higher than or equal to −200 ppm to lower than or equal to 50 ppm, inclusive, while ensuring the reproducibility of the resistance characteristic. In the above, the reason why the absolute value of the lower limit value is larger than that of the upper limit value for the range of the TCR is because the TCR of the resistor 1 as a whole is increased by the electrodes 21 and 22 stacked on the resistance body 11. Therefore, the low value is set for the lower limit value of the TCR by taking the amount to be increased into consideration.

For the proportion of titanium oxide with respect to the resistive material 11a, from the view point of the variation and the reproducibility of the resistance characteristic of the resistive material 11a, it is preferable that the content of titanium oxide be set lower than or equal to 3 vol % based on the mixture. In addition, from the view point of an operability upon handling of powder during weighing-adjustment, it is preferable that the content of titanium oxide be set higher than or equal to 0.5 vol %.

Next, a method of manufacturing the resistor 1 will be simply described with reference to FIGS. 3 and 4.

Figure 3:
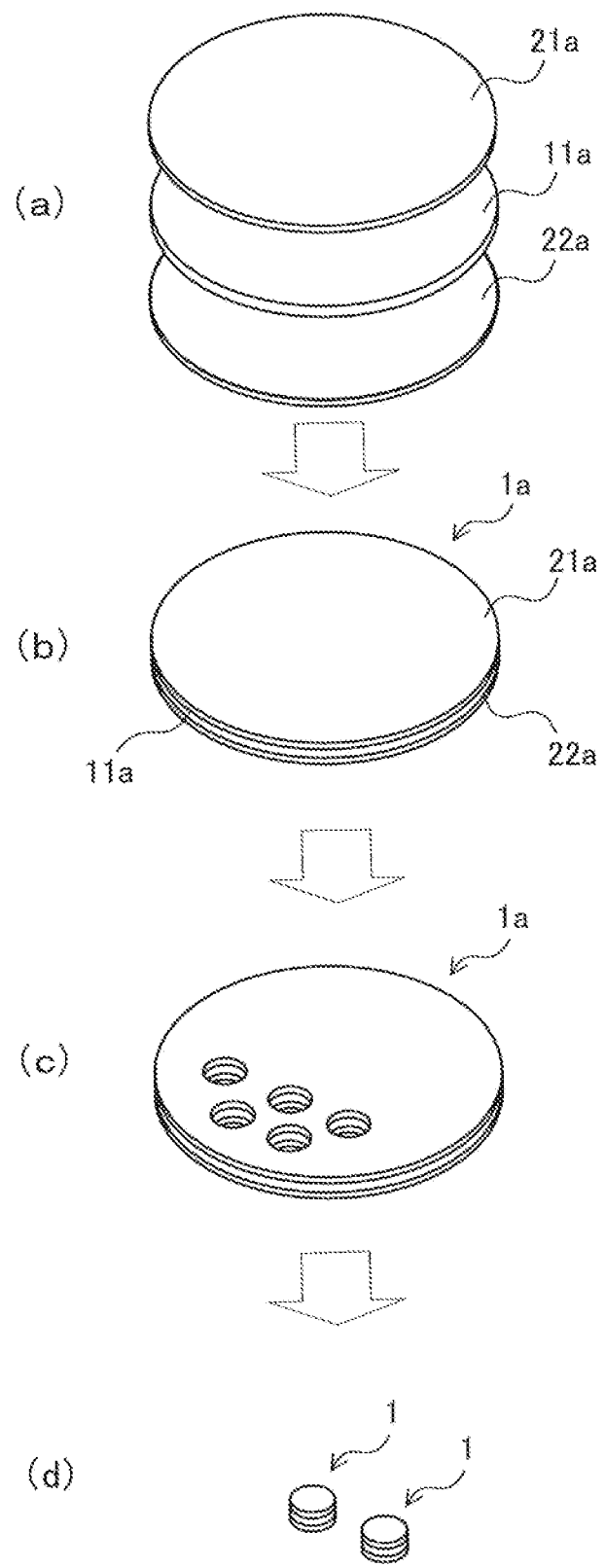
FIG. 3 is a diagram showing an example of a manufacturing method of the resistor.

FIG. 3 is a diagram showing an example of the manufacturing method of the resistor 1 of this embodiment.

The resistive material 11a having a disc shape and an electrode material 21a and an electrode material 22a respectively having a disc shape are first prepared. The electrode material 21a and the electrode material 22a are formed of the metal material having a high electrically conductive property, such as copper (Cu) for example.

As shown in FIG. 3(a), the disc-shaped electrode material 21a, the disc-shaped resistive material 11a, and the disc-shaped electrode material 22a are stacked in this order. Thus stacked materials are then joined by using, for example, a pressure welding process, a sintering process, or the like, and thereby, a stacked structure 1a is formed as shown in FIG. 3(b).

Subsequently, as shown in FIG. 3(c), the stacked structure 1a is processed into individual pieces by punching it into circular shapes by using a processing such as a punching. By doing so, the disc-shaped resistors 1 are formed as shown in FIG. 3(d).

In this embodiment, although the resistor 1 is formed to have the disc shape, the resistor 1 may be formed to have a polygonal shape such as a triangle or rectangle. The manufacturing method for forming the resistor 1 having a rectangular plate shape will be described below.

Figure 4:
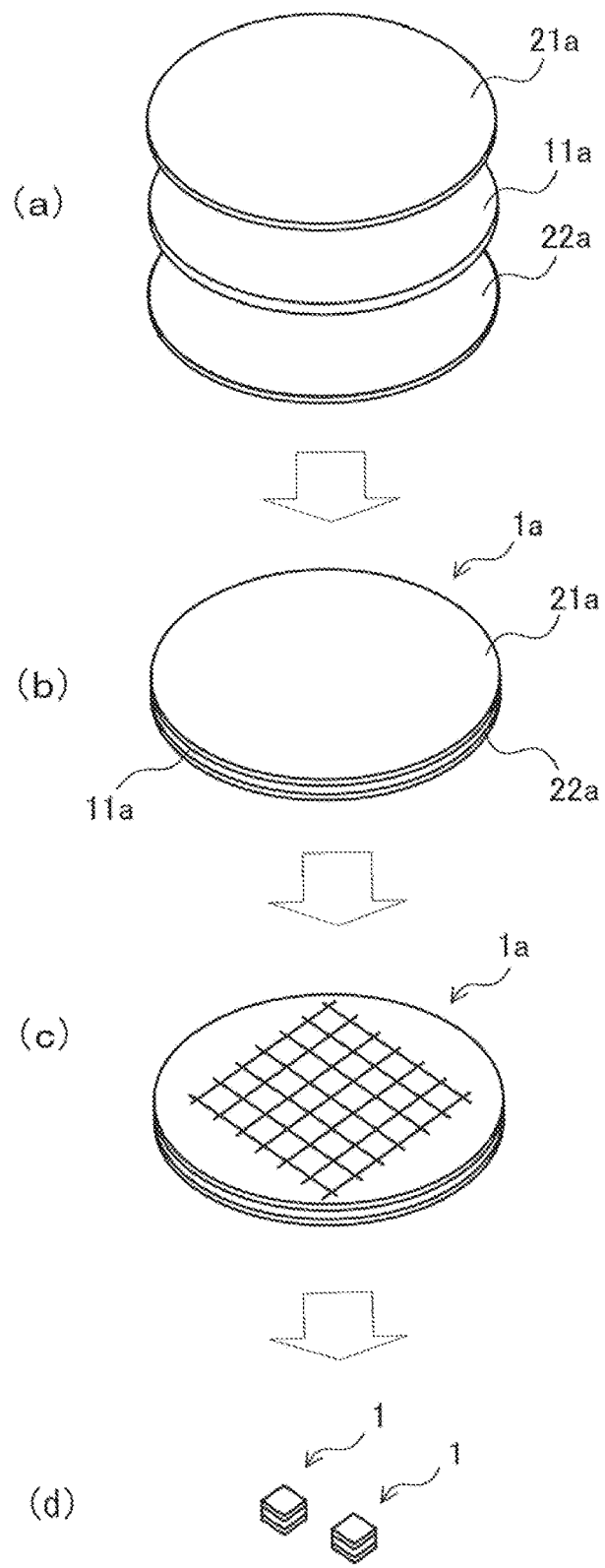
FIG. 4 is a diagram showing another example of the manufacturing method of the resistor.

FIG. 4 is a diagram for explaining another example of the manufacturing method of the resistor 1 in this embodiment. Steps shown in FIGS. 4(a) to 4(b) are the same as the steps shown in FIGS. 3(a) to 3(b).

After the stacked structure 1a is formed as shown in FIG. 4(b), as shown in FIG. 4(c), the stacked structure 1a is processed into individual pieces by cutting it into rectangular shapes by using a processing such as dicing. By doing so, as shown in FIG. 4(d), the rectangular-plate-shaped resistors 1 are formed.

Next, the manufacturing method of the resistive material 11a in this embodiment will be described.

The manufacturing method of the resistive material 11a includes a mixing step of mixing a metal powder for forming the metal particles for the resistive material 11a, an insulating powder for forming the insulating particles for the resistive material 11a, and a powder of titanium oxide serving as the additive. Furthermore, this manufacturing method has a sintering step of sintering the mixed powder, which has been obtained by the mixing in the mixing step, at a predetermined temperature while applying pressure by a uniaxial pressing.

In the mixing step, it is preferred to use the metal powder having the melting point lower than the melting point of the insulating powder and to granulate such that the particle size of the metal powder becomes smaller than or equal to the particle size of the insulating powder.

In this case, it is preferred to perform the granulation such that, after the granulation, the average particle size of the metal powder falls within the range from larger than or equal to 0.5 μm to smaller than or equal to 20 μm. In addition, it is preferred to perform the granulation such that the average particle size of the insulating powder falls within the range from larger than or equal to 0.1 μm to smaller than or equal to 10 μm. As the metal powder after the granulation, it is preferred to use particles whose aspect ratio falls within the range from greater than or equal to 1.0 to less than or equal to 2.0.

Furthermore, as a titanium oxide powder, particles whose average particle size is smaller than or equal to the average particle size of the metal powder (larger than or equal to 0.5 μm and smaller than or equal to 20 μm) may be used. From the view point of suppressing the variation of the resistance characteristic while ensuring the dispersibility into the resistive material 11a, as the titanium oxide powder, it is preferable to use particles whose average particle size falls within the range from larger than or equal to 0.01 μm (10 nm) to smaller than or equal to 0.5 μm (500 nm), after the granulation.

In the sintering step, for example, the mixed powder is subjected to the pressing by reducing the pressure inside a container of the mixed powder. As the pressure for pressing the mixed powder (pressing pressure) is increased, the specific resistance of the resistive material 11a is lowered, however, the current paths through which the current flows tend to be ensured more likely in the resistive material 11a.

Therefore, in the sintering step, the pressing pressure is preferred to be set at a higher value. In addition, a predetermined temperature (sintering temperature) is the temperature lower than the melting point of the metal powder, and it is preferable that the predetermined temperature be set at the temperature that is lower than the melting point of the metal powder by about 15%.

By performing the mixing step and the sintering step described above, it is possible to suitably manufacture the resistive material 11a. The crystal structure of the powder of titanium oxide is not particularly limited, and it may be a rutile structure, an anatase structure, or a brookite structure (an orthorhombic crystal). Regardless of the crystal structure of titanium oxide to be used, the crystal structure of titanium oxide becomes the rutile structure after the sintering.

Next, operational advantages of the resistive material 11a in this embodiment will be described.

According to this embodiment, the resistive material 11a for sensing the current includes: the metal particles selected from a group consisting of nichrome, copper-manganese, and copper-nickel; the insulating particles selected from a group consisting of alumina, aluminum nitride, silicon nitride, and zirconia; and titanium oxide.

Nichrome, copper-manganese, and copper-nickel described above are alloys used for the sensing of the current, and change in the resistance value caused by the change in the temperature of itself is relatively small.

Therefore, by using these alloys for the resistive material 11a, it is possible to ensure the resistance value required for the sensing of the current with ease and to suppress the increase in the TCR.

In addition, alumina, aluminum nitride, silicon nitride, and zirconia described above are the ceramic materials, and they are used as materials for a substrate because of the low coefficient of thermal expansion. Thus, by using these as the insulating particles, the thermal stress of the resistance body 11 formed of the resistive material 11a can be made to approach the thermal stress of the substrate, and thereby, it is possible to suppress formation of the crack due to the heat cycle between the resistance body 11 and the substrate.

Furthermore, because the above-described titanium oxide has higher melting point than the metal particles, titanium oxide tends not to react with the metal particles, and therefore, it is possible to disperse titanium oxide into the resistive material 11a. Thus, it is possible to suppress the variation of the resistance characteristic of the resistive material 11a.

As described above, by dispersing titanium oxide having the insulating property into the resistive material 11a, the specific resistance of the resistive material 11a is increased, and at the same time, the variation of the resistance characteristic of the resistive material 11a can be suppressed. Furthermore, because titanium oxide has a property in that the current is allowed to flow through more easily with the increased temperature, it is also possible to reduce the TCR of the resistive material 11a as a whole.

Therefore, by configuring the resistive material 11a as described above, it is possible to increase the specific resistance of the resistive material 11a and to make the fluctuation of the resistance value of the resistive material 11a controllable.

In addition, according to this embodiment, the present inventors assume that the resistive material 11a has the structure in which the insulating particles are enclosed by the metal body, which is formed by the metal particles brought into contact with each other, and in which titanium oxide is at least dispersed in the metal body.

The present inventors further assume that, because the insulating particles are surrounded by the metal body, the metal body is formed to have a three-dimensional network so as to enclose the insulating particles. Therefore, it is thought that the current passages are ensured and the variation in the resistance characteristic is suppressed in the resistive material 11a, and in addition, interruption of the current paths due to the temperature change, application of high voltage, or the like is less likely to be caused, and so, the resistance characteristic of the resistive material 11a has become more likely to be stabilized.

In addition, also in the metal body forming the current paths in the resistive material 11a, because titanium oxide having the insulating property is dispersed therein, it is possible to increase the specific resistance of the resistive material 11a, and at the same time, to suppress the variation in the resistance characteristic. In addition, because the amount of increase in the resistance value of the metal particles for the resistive material 11a along with the increase in the temperature is larger than that of the insulating particles, by dispersing titanium oxide, the resistance value of which is decreased along with the temperature increase, into the metal body, it is possible to surely reduce the TCR of the resistive material 11a.

Therefore, by using titanium oxide, because titanium oxide is dispersed into the metal body, the resistance value of which is fluctuated along with the temperature change, it is possible to increase the specific resistance in the resistive material 11a while effectively reducing the TCR.

In addition, according to this embodiment, it is preferable to use the resistive material 11a in which the volume ratio of the insulating particles is higher than or equal to the volume ratio of the metal particles. By doing so, the ratio of titanium oxide in the resistive material 11a relative to the metal particles is increased, and therefore, it is possible to more effectively control the TCR and the specific resistance of the resistive material 11a. For example, if the TCR and the specific resistance of the resistive material 11a can be ensured even with a small amount of titanium oxide, it become also possible to reduce the amount of titanium oxide to be added.

In addition, according to this embodiment, it is preferable that the proportion (content) of titanium oxide with respect to the resistive material 11a be set at lower than or equal to 3 vol % based on the mixture. By doing so, it is possible to suppress the variation in the TCR and the specific resistance of the resistive material 11a.

In addition, according to this embodiment, by forming the resistive material 11a by using the insulating particles, the metal particles, and the particles of titanium oxide, it becomes possible to control the TCR of the resistive material 11a so as to fall within a range from higher than or equal to −200 ppm to lower than or equal to 50 ppm, inclusive. By doing so, the fluctuation of the resistance value along with the temperature change in the resistive material 11a can be suppressed, and therefore, it is possible to suppress decrease in a sensing accuracy during the sensing of the current using the resistor 1 that is formed by using the resistive material 11a.

In addition, according to this embodiment, the resistive material 11a is formed of the sintered body that is formed of the insulating particles, the metal particles, and titanium oxide. Because the sintered body is formed by mixing and sintering the metal powder, the insulating powder, and the titanium oxide powder, it is possible to disperse titanium oxide in the insulating particles and the metal particles of the resistive material 11a.

In addition, according to this embodiment, the resistor 1 has the resistance body 11 that is formed of the above-described resistive material 11a and the two electrodes 21 and 22 that sandwich the resistance body 11 therebetween. With such a configuration, because the resistance body 11 that is formed of the resistive material 11a in which titanium oxide is dispersed is used, it is possible to provide the resistor 1 with a high the specific resistance and the stable resistance characteristic.

In addition, according to this embodiment, in the manufacturing method of the resistive material 11a: the insulating powder having the insulating property, the metal powder having the electrically conductive property, and the titanium oxide powder are mixed; the mixed powder is heated to a predetermined temperature that is lower than the melting point of the metal powder; and in this state, the mixed powder is sintered under pressure. By doing so, it is possible to manufacture the resistive material 11a in which titanium oxide is dispersed in the metal body forming the three-dimensional network enclosing the insulating particles.

In addition, according to this embodiment, as titanium oxide contained in the mixed powder, the powder having the average particle size that is smaller than or equal to the average particle size of the metal powder is used. Thus, it is possible to allow titanium oxide to be dispersed at a higher degree than the metal particles in the resistive material 11a.

Especially, it is preferable to use the titanium oxide powder having the average particle size of larger than or equal to 10 nm. By doing so, it is possible to suppress the variation in the TCR and the specific resistance of the resistive material 11a.

Although the embodiment of the present disclosure has been described in the above, the above-mentioned embodiment merely illustrates a part of application examples of the present disclosure, and the technical scope of the present disclosure is not intended to be limited to the specific configurations of the above-described embodiment.

For example, although the areas and the thicknesses of the electrodes 21 and 22 of the resistor 1 are equal to each other in the above-mentioned embodiment, the electrodes 21 and 22 may be formed such that at least one of the areas and thicknesses is different from each other. In addition, a through hole may be formed in the electrodes 21 and 22.

In addition, a method for forming the electrodes 21 and 22 on both surfaces of the resistive material 11a may includes a plating process, vacuum deposition process, ion plating process, sputtering process, vapor deposition process, cold spray process, or the like.

EXAMPLE

Next, test specimens were prepared according to the resistive material 11a of this embodiment, and evaluations of the resistance characteristic as the resistive material 11a and the structure thereof were performed by conducting various measurements. In the following, a preparation method of the test specimens and the evaluation thereof will be described.

Preparation of Test Specimen for Evaluation of Resistance Characteristic

Examples 1 to 3

As the insulating powder for preparing the resistive material 11a, a powder of alumina [ALM-41-01 from Sumitomo Chemical Company, Limited] was used. In addition, a powder of nichrome [a powder (D50) having the particle size of 6 μm obtained by producing Evanome® by a matomization process] was used as the metal powder for preparing the resistive material 11a.

In addition, as the titanium oxide powder for preparing the resistive material 11a, a powder having the particle size of 20 nm [Aeroxide® Ti02 P25 from NIPPON AEROSIL CO., LTD.] and a powder having the particle size of 180 nm [JA-1 from Tayca Corporation] were used.

Mixing and Granulation

The insulating powder, the metal powder, and the titanium oxide powder described above were first weighed according to mixing ratios shown in Table 1, and the respective powders were granulated after being mixed until substantially homogeneous mixture was obtained by using a mortar and a pestle.

Average particle sizes of the respective particles in thus granulated mixed powder (the mixture) are as follow:
Alumina powder: average particle size 2.2 μm
Nichrome powder: average particle size 2.0 μm
Titanium oxide powder: average particle size 0.02 μm (20 nm)

Pressurization and Sintering

Next, the granulated mixed powder was transferred to a carbon die having a diameter of 10 mmφ, and the carbon die was placed in a hot-press furnace (Multi-purpose high temperature furnace Hi multi® 5000 from Fuji Dempa Kogyo Co., Ltd.). In the hot-press furnace, the mixed powder in the carbon die was heated to the predetermined temperature, which was lower than the melting point of nichrome, and at this state, the mixed powder was sintered under pressure. Thus obtained sintered body having a disc shape with the diameter of 10 mm and the thickness of 1.8 mm was taken as the test specimen.

Hot-pressing conditions were set as following:
Atmosphere: 20 Pa or lower
Pressing Pressure: 0.8 kN or more and 3.9 kN or less
Sintering Temperature: 900° C. or more and 1300° C. or less
Holding Time: 5 min. or more and 20 min. or less The titanium oxide powder having the average particle size of 20 nm was used, and test specimens T1 to T3 of examples 1 to 3 were prepared by changing the amount of the titanium oxide powder added while keeping a ratio of the alumina powder to the nichrome powder at 1:1 relationship.

Examples 4 to 6

The same preparation conditions as those for the examples 1 to 3 were employed except that, for titanium oxide, the powder having the average particle size of 180 nm was used instead of the powder having the average particle size of 20 nm. In such conditions, test specimens T4 to T6 of examples 4 to 6 were prepared by changing the added amount of the titanium oxide powder having the average particle size of 180 nm while keeping a ratio of the alumina powder to the nichrome powder at 1:1 relationship.

Comparative Example 1

A test specimen T10 was prepared by adjusting the ratio of the alumina powder to the nichrome powder at 1:1 without adding titanium oxide.

Preparation of Test Specimen for Evaluation of Structure

Example 7

The test specimen T1 of example 1 prepared as a test specimen for evaluation of the resistance characteristic was used.

Comparative Example 2

A test specimen T11 was prepared by adding 5 vol % of tin oxide only instead of titanium oxide.

Evaluation Method

Following evaluation tests were conducted for the test specimens obtained as described above.

Resistance Characteristic

Calculation of the Specific Resistance

The resistance value Ra of the test specimen when the temperature of the test specimen was at the reference temperature of 25° C. was measured, and the specific resistance was calculated according to the following expression (1) based on the resistance value Ra.

$$\text{Specific Resistance } (\mu\Omega \cdot cm) = Ra(\Omega) \times S(cm2)/Th(cm) \quad (1)$$

In the above, the area S is $0.25\pi$ (cm2), and the thickness Th is 0.18 (cm).

Measurement of TCR (Temperature Coefficient of Resistance)

The resistance value R of the test specimen when the temperature of the test specimen reached the test temperature of 100° C. was measured, and the TCR was calculated according to the following expression (2) based on the resistance value R and the above-described resistance value Ra at the reference temperature of 25° C.

$$TCR(ppm/° C.) = (R - Ra)/Ra \div (T - Ta) \times 10^6 \quad (2)$$

In the above, the reference temperature Ta is 25° C., and the test temperature T is 100° C. The test temperature T is the temperature of the resistor that is expected when the resistor reached the steady state.

Structure

A scanning electron microscope (NB-5000 from Hitachi High-Technologies Corporation) and an Energy Dispersive X-ray microanalyzer (a sensing unit: Xflash4010, a control unit: SEVIII from BRUKER) were used to acquire sectional images of the test specimens T1, T11 by an element mapping technique.

Evaluation Results

Evaluation results for the test specimens will be described below.

Structure

Figure 5:
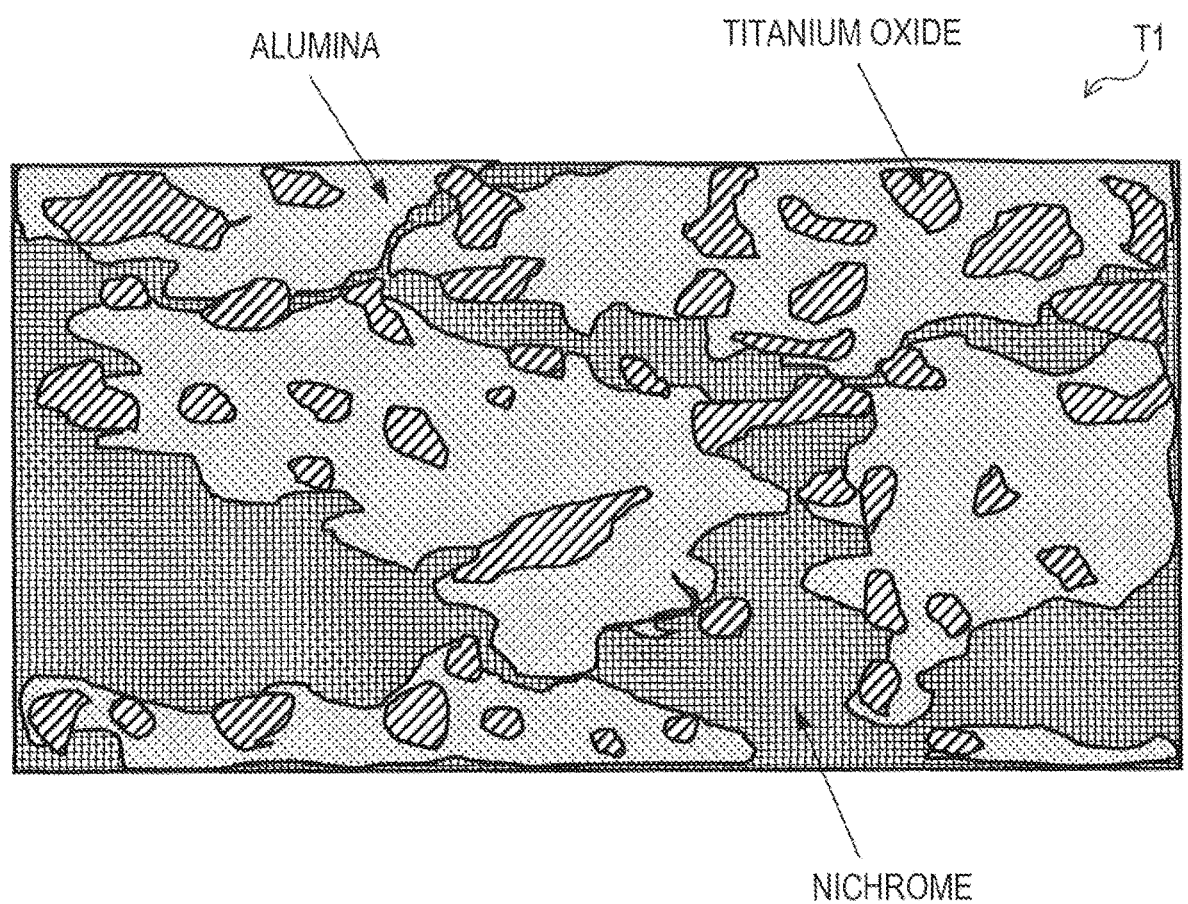
FIG. 5 is a diagram showing a structure of a test specimen having titanium oxide in an example.

FIG. 5 is a sectional view schematically showing a cross-section of the test specimen T1 that was obtained as an example 7 by adding only 1.1 vol % of titanium oxide in a state in which the ratio of the alumina powder to the nichrome powder was at 1:1. This sectional view is created by using the images respectively acquired for alumina, nichrome, and titanium oxide forming the test specimen T1 by the element mapping technique.

As shown in FIG. 5, the test specimen T1 has a sea-island structure consisting of island portions containing the alumina particles serving as the insulating particles and sea portions formed of nichrome particles forming the metal body. It is thought that the sea-island structure similar to that shown in FIG. 5 is seen even if the test specimen T1 is cut in any directions.

In other words, it is thought that, in the test specimen T1, many nichrome particles were melted and fused three-dimensionally around non-molten alumina particles, and thereby, a network of nichrome body was formed so as to form the three-dimensional network.

It is thought that: the titanium oxide particles are discretely scattered in the nichrome body formed by the connected nichrome particles and the alumina particles; in other words, titanium oxide is dispersed in the insulating particles and the metal body; and even if copper-manganese or copper-nickel is used instead of nichrome for the metal body, similarly to the case where nichrome is used, no reaction is caused between titanium oxide and the metal body, and titanium oxide is dispersed. In addition, it is thought that, even if aluminum nitride, silicon nitride, or zirconia is used instead of the alumina particles for the insulating particles, similarly to the case where the alumina particles are used, titanium oxide is dispersed.

It is thought that the titanium oxide particles have a tendency to attach to the surfaces of the alumina particles. Thus, as shown in FIG. 5, the titanium oxide particles appear to be dispersed so as to surround at least parts of the surfaces of the alumina particles.

Figure 6:
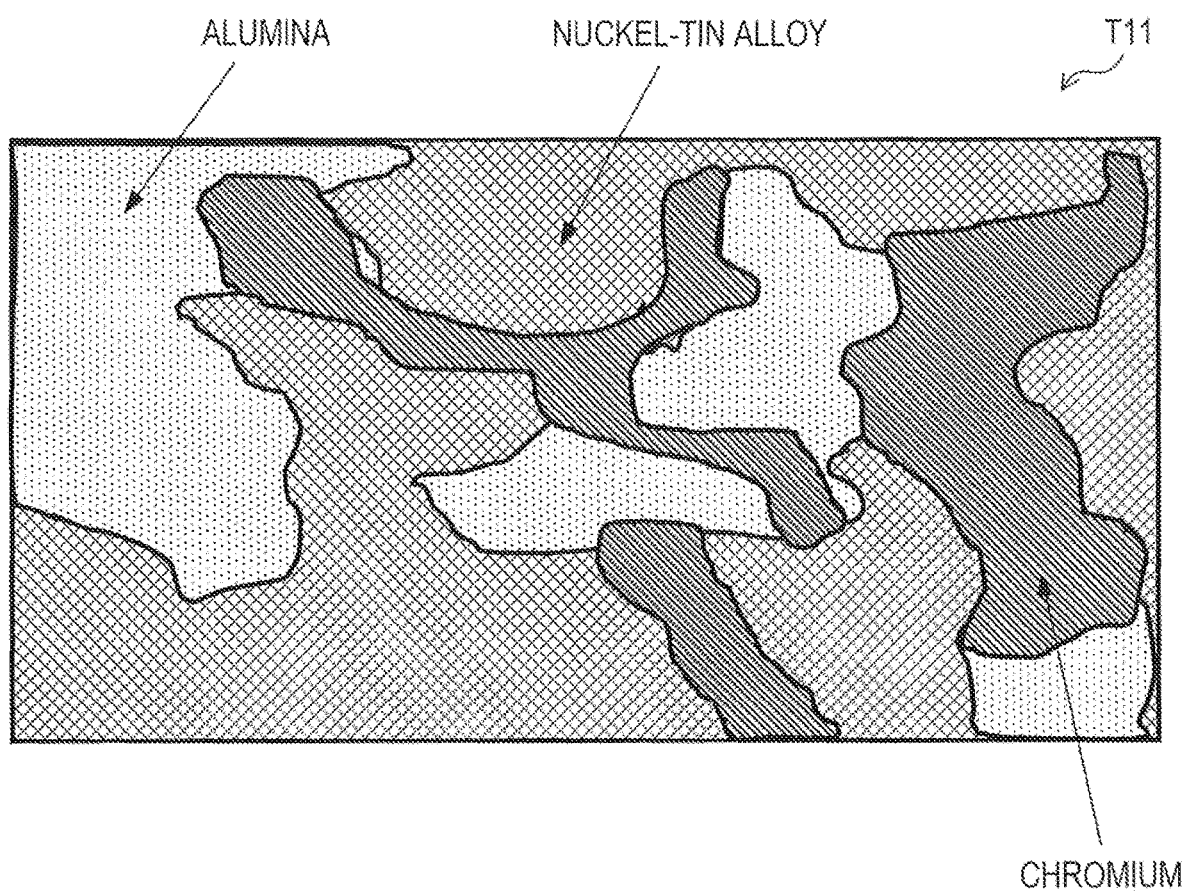
FIG. 6 is a diagram showing a structure of a test specimen having tin oxide in a comparative example.

FIG. 6 is a sectional view schematically showing a cross-section of the test specimen T11 that was obtained as a comparative example 2 by adding tin oxide instead of titanium oxide. This sectional view is created by using the images respectively acquired for alumina, nickel, chromium, and tin forming the test specimen T11 by the element mapping technique.

As shown in FIG. 6, a nickel-tin alloy is formed through an reaction caused between tin derived from deoxygenated tin oxide and nickel derived from nichrome from which chromium has separated via reduction reaction, and element chromium separated from nichrome is formed around the nickel-tin alloy. As described above, if tin oxide is added instead of titanium oxide, tin oxide undergoes the reaction with the metal particles, and therefore, tin oxide is no longer dispersed as a result.

Therefore, as shown in FIG. 5, it was found that, by using titanium oxide with a superior chemical stability as the additive, the metal particles and the titanium oxide particles did not undergo any reactions, and the titanium oxide particles were dispersed in the insulating particles and the metal body.

Resistance Characteristic

The resistance characteristics of the test specimens are shown in Tables 1 and 2.

TABLE 1

| | | | Example | | | Comparative Example 1 |
| --- | --- | --- | --- | --- | --- | --- |
| | | | Example 1 | Example 2 | Example 3 | |
| | | | Test Specimen Number | | | |
| | | | T1 | T2 | T3 | T10 |
| Resistive Material | Mixing Ratio [vol %] | Alumina Powder | 49.45 | 48.5 | 47.5 | 50 |
| | | Nichrome Powder | 49.45 | 48.5 | 47.5 | 50 |
| | | Titanium Oxide Powder @Particle Size 20 nm | 1.1 | 3 | 5 | 0 |
| Results | Resistance Characteristic | TCR[ppm] (25° C.→100° C.) | 0 | −200 | −800 | 25 |
| | | Specific Resistance @25° C. [µΩ · cm] | 1,050 | 2,300 | 2,200 | 710 |

TABLE 2

|  |  |  | Example | | | Comparative Example 1 |
|---|---|---|---|---|---|---|
|  |  |  | Example 4 | Example 5 | Example 6 |  |
|  |  |  | Test Specimen Number | | | |
|  |  |  | T4 | T5 | T6 | T10 |
| Resistive Material | Mixing Ratio [vol %] | Alumina Powder | 49.45 | 48.5 | 47.5 | 50 |
|  |  | Nichrome Powder | 49.45 | 48.5 | 47.5 | 50 |
|  |  | Titaniunn Oxide Powder @Particle Size 20 nm | 1.1 | 3 | 5 | 0 |
| Results | Resistance Characteristic | TCR[ppm] (25° C.→100° C.) | 20 | 0 | −600 | 25 |
|  |  | Specific Resistance @25° C. [µΩ · cm] | 1,100 | 1,500 | 2,000 | 710 |

Table 1 will be described first. Table 1 shows the resistance characteristics of the test specimens T1 to T3 prepared by using the titanium oxide powder having the average particle size of 20 nm, and the resistance characteristic of the test specimen T10, serving as a comparative example 1, prepared without adding the titanium oxide powder.

According to the results shown in Table 1, for the TCR, the TCR of the test specimen T1, in which the amount of titanium oxide added (the content) was 1.1 vol %, was "0" and was lower than the TCR of the test specimen T10 by "25". The TCR of the test specimen T2, in which the amount of titanium oxide added was 3 vol %, was "−200" and was lower than the TCR of the test specimen 10 by "225".

As described above, it was found that there was a tendency for the TCR to be reduced as the amount of titanium oxide add was increased. It is assumed that the reason for this tendency is that, because titanium oxide has a property in that its resistance value is decreased as the temperature is increased, as the proportion of titanium oxide in the test specimens T1 to T3 is increased, a degree of contribution of the above-described property of titanium oxide to the TCRs of the test specimens T1 to T3 has increased.

For the decrease in the TCR, because the titanium oxide particles have the tendency to be dispersed in the alumina particles and the nichrome body as shown in FIG. 5, even if the ratio of the alumina powder to the nichrome powder is changed from 1:1 to 7:3, for example, the decrease in the TCR is thought to show the similar tendency with the results shown in Table 1.

As described above, by changing the amount of titanium oxide added, it becomes possible to control the TCR to fall within a design range from higher than or equal to −200 ppm to lower than or equal to 50 ppm, and from the view point of ensuring the sensing accuracy of the current, it is possible to allow the TCR of the resistor having the pair of electrodes to fall within a desired design range.

On the other hand, it was found that there was a tendency for the variation of the TCR to be increased as the amount of titanium oxide add was increased, and when the amount of titanium oxide added was 5 vol %, the variation of the TCR became too large.

The reason for this is assumed to be that, as the amount of titanium oxide added was increased, a proportion of parts where the current paths are interrupted by the titanium oxide particles in the nichrome body of the three-dimensional network becomes more likely to be fluctuated. Therefore, in order to suppress the variation of the TCR, it is preferable to make the amount of titanium oxide added so as to be lower than or equal to 3 vol %.

In addition, according to the results shown in Table 1, for the specific resistance, the specific resistance of the test specimen T1, in which the amount of titanium oxide added was 1.1 vol %, was "1,050" and was higher than the specific resistance of the test specimen T10 by "340". Furthermore, the specific resistance of the test specimen T2, in which the amount of titanium oxide added was increased to 3 vol %, was "2,300" and was higher than the specific resistance of the test specimen T10 by "1,590". The value of the specific resistance was substantially the same as the specific resistance of the resistive material in which titanium oxide was not added and the ratio of the alumina powder to the nichrome powder was 6:4.

As described above, it was found that there was a tendency for the specific resistance to be increased as the amount of titanium oxide added was increased. The reason for this is assumed to be that, as the amount added of titanium oxide having higher specific resistance than the metal body is increased, the number of the titanium oxide particles dispersed within the nichrome body is increased, and therefore, it becomes more difficult for the current to flow through the nichrome body, and so, the specific resistance is increased.

For the amount of increase of the specific resistance, it is thought that, by increasing the volume ratio of the alumina powder so as to be higher than the volume ratio of the nichrome powder, the proportion of the nichrome body in the resistive material 11a is reduced, and thereby, the amount of increase of the specific resistance becomes higher than the results shown in Table 1.

In addition, it was found that, similarly to the variation of the TCR, there was a tendency for the variation of the specific resistance to be increased as the amount of titanium oxide added was increased, and that the variation of the specific resistance became too large for the test specimen T3 in which the amount of titanium oxide added was 5 vol %.

Next, the results shown in Table 2 will be described. In Table 2, in contrast to the case for Table 1, the resistance characteristics of test specimens T4 to T6 prepared by using the titanium oxide powder having the average particle size 180 nm are shown.

According to the results shown in Table 2, for the TCR, similarly to case for Table 1, it was found that, although the tendency for the TCR to be reduced as the amount of titanium oxide added was increased was maintained, the amount of reduction of the TCR became smaller compared with the case for Table 1. The reason for this is assumed to be that, by increasing the average particle size of the titanium oxide particles from 20 nm to 180 nm, the dispersibility of titanium oxide is lowered, and so the contribution of the property of titanium oxide was lowered.

In addition, it was found that, although there was a tendency for the variation of the TCR to be increased as the amount of titanium oxide added was increased, the variation itself of the TCR was smaller compared with the case for Table 1. The reason for this is assumed to be that, as the dispersibility of titanium oxide is lowered, the number of parts where the current paths in the nichrome body are interrupted by the titanium oxide particles is reduced.

In addition, according to the results shown in Table 2, for the specific resistance, similarly to the case for Table 1, although there was a tendency for the specific resistance to be increased as the amount of titanium oxide added was increased, the amount of increase of the specific resistance was smaller compared with the case for Table 1. In addition, although there was a tendency for the variation of the specific resistance to be increased as the amount of titanium oxide added was increased, it was found that the variation itself of the specific resistance was smaller compared with the case for Table 1.

As described above, even if the average particle size of the titanium oxide powder is increased from 20 nm to 180 nm, it is possible to increase the specific resistance, and at the same time, reduce the TCR. In addition, although the amount of reduction of the TCR and the amount of increase of the specific resistance are smaller, it is possible to reduce the variations for both of the TCR and the specific resistance.

Although the titanium oxide powder having the average particle size of 180 nm was used for the examples shown in Table 2, it is thought that the dispersibility of titanium oxide can be ensured as long as the average particle size of the titanium oxide powder is smaller than or equal to the average particle size of the nichrome powder.

Therefore, by setting the average particle size of the titanium oxide powder so as to be smaller than or equal to the average particle size of the metal powder, it is possible to increase the specific resistance and to reduce the TCR, at the same time, in the resistive material 11a while suppressing the variation. It is thought that the amount of reduction of the TCR and the amount of increase of the specific resistance will be reduced as the average particle size of the titanium oxide powder approaches the average particle size of the metal powder.

In addition, the titanium oxide powder having the average particle size of 20 nm was used in the examples 1 to 3 shown in Table 1. However, it is thought that, even if the titanium oxide powder having the average particle size of 10 nm is used, the influence on the dispersibility of titanium oxide is small, and the results similar to those shown in Table 1 will be obtained.

Therefore, by setting the average particle size of the titanium oxide powder so as to be larger than or equal to 10 nm, there will be no need to prepare the titanium oxide powder having excessively small particle size, and therefore, it is possible to increase the specific resistance and to reduce the TCR in the resistive material 11a while reducing a manufacturing cost.

From the above-described results, it was found that, by configuring the resistive material 11a by using the insulating particles, the metal particles, and the titanium oxide particles, it is possible to obtain stable resistance characteristic by increasing the specific resistance and by reducing the TCR in the resistive material 11a.

In the above-described examples 1 to 6, nichrome was used as the metal particles; however, even if an alloy selected from a group consisting of copper-manganese and copper-nickel of other types is used, it is possible to employ the similar manufacturing method for forming the resistive material 11a. Furthermore, for the content of the alloy, from the view point of ensuring the specific resistance that is higher than that of the alloy itself while maintaining functions as the resistance body, the ratio is preferably higher than or equal to 30 vol % and lower than or equal to 80 vol %.

In addition, alumina was used as the insulating particles; however, it is thought that, even if a ceramic powder selected from a group consisting of aluminum nitride, silicon nitride, and zirconia is used, the similar the resistance characteristic is obtained.

In addition, in the above-described examples 1 to 6, only the nichrome powder, the alumina powder, and the titanium oxide powder were used for the resistive material 11a to form the test specimens T1 to T4; however, the modifier for improving the resistance characteristic may also be added. In addition, in the above-described examples 1 to 6, the metal particles were used as the matrix material; however, the insulating particles may also be used as the matrix material.

The present application claims a priority based on Japanese Patent Application No. 2019-072722 filed on Apr. 5, 2019 in the Japan Patent Office, the entire contents of which are incorporated herein by reference.

The invention claimed is:

1. A resistive material comprising:
metal particles selected from a group consisting of nichrome, copper-manganese, and copper-nickel; insulating particles selected from a group consisting of alumina, aluminum nitride, silicon nitride, and zirconia; and titanium oxide, wherein the insulating particles are surrounded by a metal body, the metal body being formed by the metal particles brought into contact with each other, and the titanium oxide is at least dispersed in the metal body.

2. The resistive material according to claim 1, wherein a volume ratio of the insulating particles is higher than or equal to a volume ratio of the metal particles.

3. The resistive material according to claim 1, wherein a ratio of the titanium oxide to the resistive material is lower than or equal to 3 vol %.

4. The resistive material according to claim 1, wherein a temperature coefficient of resistance is higher than or equal to −200 ppm and lower than or equal to 50 ppm.

5. The resistive material according to claim 1, wherein the resistive material is a sintered body formed of the metal particles, the insulating particles, and the titanium oxide.

6. A resistor having the resistive material according to claim 1 and two electrodes, the electrodes being provided such that the resistive material is sandwiched between the electrodes.

7. A manufacturing method of a resistive material comprising:
a step of mixing an insulating powder having an insulating property, a metal powder having an electrically conductive property, and titanium oxide powder; and
a step of sintering a mixed powder obtained by the mixing step at a predetermined temperature under pressure, the predetermined temperature being lower than melting point of the metal powder, wherein the metal powder includes metal particles and the insulating powder includes insulating particles, and the metal particles are sintered around the insulating particles to form a three-dimensional network enclosing the insulating powder.

8. The manufacturing method of the resistive material according to claim 7, wherein an average particle size of the titanium oxide powder is smaller than or equal to an average particle size of the metal powder.

9. The manufacturing method of the resistive material according to claim 8, wherein the average particle size of the titanium oxide powder is larger than or equal to 10 nm, wherein metal particles are sintered to form a metal body, and the titanium oxide powder is at least dispersed in the metal body.

* * * * *